April 18, 1933.   A. C. BENSON   1,904,350
CLUTCH FOR HOISTING DRUMS
Filed May 26, 1928   2 Sheets-Sheet 2
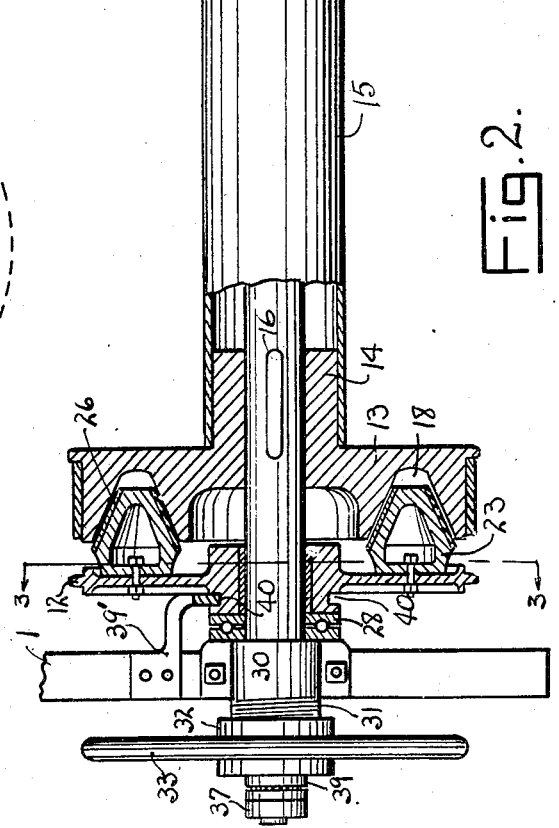
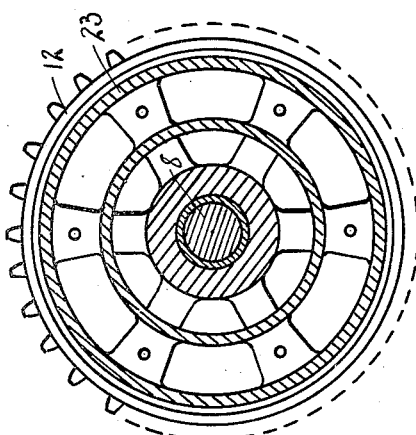
ARTHUR C. BENSON  Inventor
By  Jesse R. Stone
His Attorney Patented Apr. 18, 1933

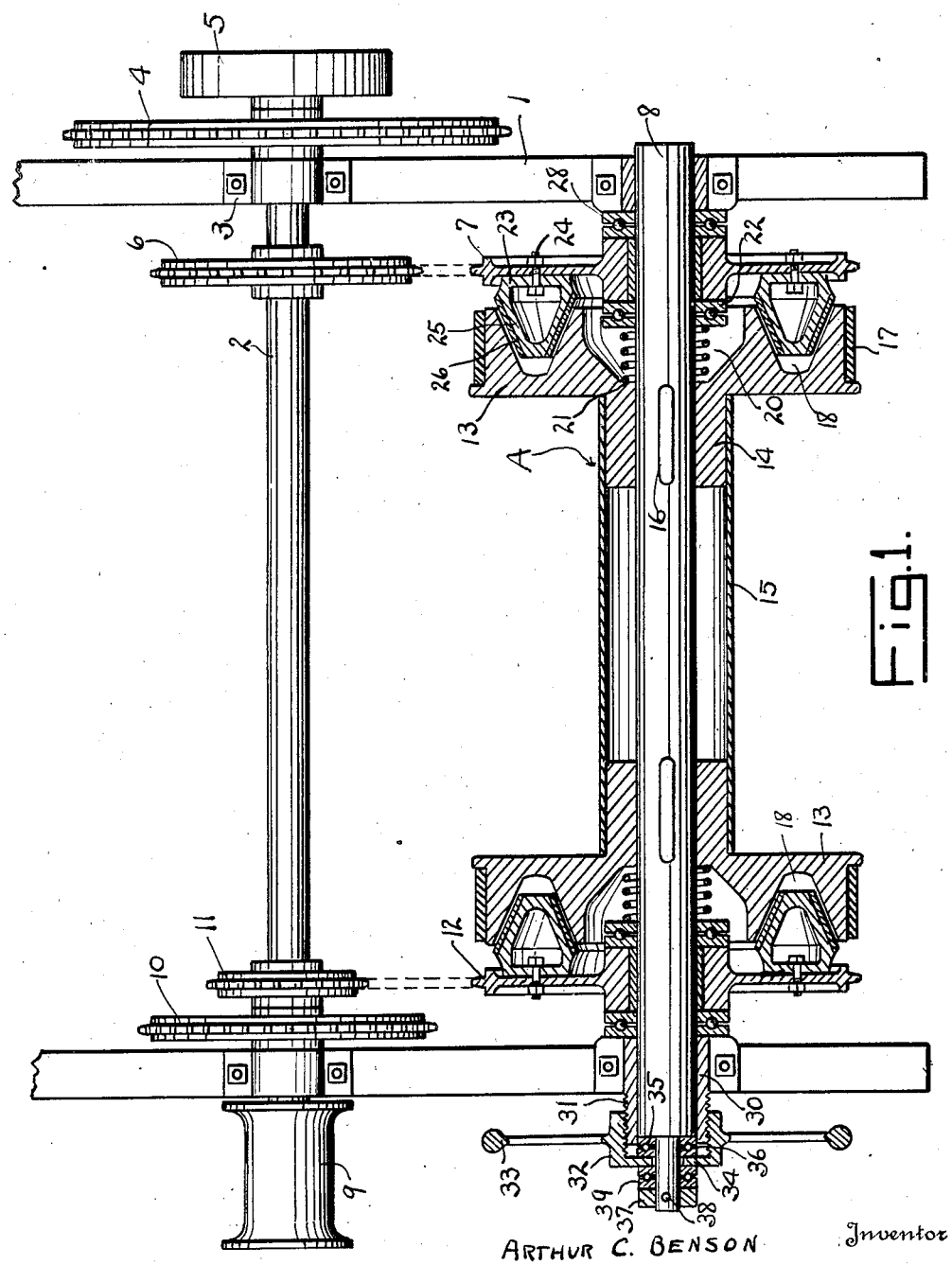

1,904,350

UNITED STATES PATENT OFFICE

ARTHUR C. BENSON, OF HOUSTON, TEXAS, ASSIGNOR TO JAMES S. ABERCROMBIE, OF HOUSTON, TEXAS

CLUTCH FOR HOISTING DRUMS

Application filed May 26, 1928. Serial No. 280,873.

My invention relates to hoisting drums such as are ordinarily employed on the drawworks of an oil drilling or pumping rig. The invention pertains particularly to the clutch, by means of which power may be communicated to the hoisting drum from the source of power.

It is an object of the invention to provide a frictional clutch at each end of the hoisting drum and means for regulating the same, so that a plurality of running speeds may be communicated to the drum.

It is a difficulty commonly experienced in running the drawworks of a rig, where an internal combustion engine is used as a source of power, that an ordinary toothed clutch is undesirable, due to the fact that the motor running at high speed will exert a shock upon the apparatus when this type of clutch is suddenly connected with the hoisting drum. By the use of a frictional clutch this difficulty may be largely avoided, but where such a clutch is used it is difficult to adjust the speed in the manner desired.

My improvement includes a frictional clutch, and means to positively adjust the same to obtain a plurality of speeds without exerting a shock upon the drum and the engine.

It is also desired to provide an adjusting means for regulating the operation of a clutch which will hold the parts in the desired position positively, so that they may not accidentally shift from the desired position.

Referring to the drawings herewith, Fig. 1 is a front view showing my improved clutch, the clutch and the drum to which it is applied being in central longitudinal section.

Fig. 2 is a broken view of the hoisting drum illustrating a modified means for holding the clutch positively in the desired position.

Fig. 3 is a transverse section on the plane 3—3 of Fig. 2.

The arrangement of my hoisting drum and the improved clutch thereon for operation is intended to be that of the usual hoisting drum. It is mounted upon jack posts 1, usually placed in a slightly inclined position at the side of the derrick. The power is communicated to an upper shaft 2 mounted in bearings 3, upon the said jack posts. Said shaft has at one end thereof a sprocket wheel 4, and a pulley 5, adapted for use in communicating power to adjacent operative devices. On the shaft 2, between the jack posts, is a sprocket wheel 6 which is adapted to be connected to a sprocket wheel 7, on an adjacent shaft 8 by means of a sprocket chain in the usual manner.

At the opposite end of the shaft 2, and outside the jack posts, is a small winding spool 9, ordinarily referred to as the cat head. On the opposite side of the jack post is a sprocket wheel 10, which may be employed to connect this shaft operatively with a power shaft from an engine. Adjacent to sprocket wheel 10 is a small sprocket wheel 11 adapted to be connected by a sprocket chain with a wheel 12 upon the shaft 8 parallel therewith.

The shaft 8 is spaced somewhat from the shaft 2, and has mounted thereon the hoisting drum indicated generally at A. This drum comprises a brake flange 13 at each end thereof, said flange having a hub 14 thereon, the two opposite hubs being presented inwardly as shown in Fig. 1. A hollow spool 15 is mounted on these hubs to form a base upon which the cable may be wound. The hubs 14 of the brake flanges are keyed at 16 to the shaft 8, and it is to be understood that they are thereby fixed rigidly to the shaft against movement longitudinally or circumferentially.

The outer periphery of the brake drum 13 is adapted to receive a brake band 17 in the usual manner, and it is to be understood that this brake band is adapted to be operated in any desired manner now old in the art.

The outer face of the brake drum 13 is provided with an annular groove 18 which is tapered from the outer face inwardly, as will be apparent from the drawings. Inside the flange relative to the groove 18, the face of the drum is recessed at 20 to house a spring 21 fitting about the shaft and bearing at its outer end against an antifriction bearing 22.

The sprocket wheels 7 at each end of the drum are provided with clutch members 23. These clutch members comprise an annular ring adapted to be bolted at 24 to the sprocket wheel and having an inner face tapered as shown at 25, to fit within the tapered groove or recess 18 in the drum. The tapered faces of the ring are preferably provided with a facing 26 of some frictional material such as is ordinarily employed on brake bands and the like. This facing forms a frictional contact with the two tapering sides of the grooves 18, to engage the ring with the drum when pressure is applied against the two parts. The ring 23 preferably is made hollow for purposes of lightness as will be seen from the drawings.

Between the sprocket wheels 7 and 12 and the jack posts, I prefer to place antifriction bearing 28, to take up the end thrust of the drum in operation.

The shaft 8 is mounted slidably in bearings at each end, the bearings at one end being extended beyond the jack post as shown at 30. The outer end of the bearing sleeve upon the jack post is threaded at 31, to receive a hand nut or cap 32. Said nut has a handwheel 33 thereon, by means of which it may be rotated. The outer end of the nut has an inwardly extending flange 34, and the shaft 8 at its outer end is reduced materially in diameter providing a shoulder at 35. Between this shoulder and the flange 34 of the nut is a ball race 36. A similar bearing member 39 is placed outside of the flange 34, said bearing member being held in position by a washer 37 fixed to the shaft by a pin 38.

It will be apparent that the rotation of the nut 32 will be adapted to move the shaft 8 longitudinally in its bearings, and as the drum A is fixed to the shaft the drum will be moved therewith. The space between the sprocket wheels 7 and 12 is so arranged that the clutch members 23 at each end thereof will not both be in engagement with the drum at the same time. In fact there is a neutral position indicated in Fig. 1 in which neither end of the drum will be in contact with its clutch member 23. The movement of the shaft with the drum thereon in either direction through the rotation of the nut 32 will bring the drum into engagement with one of said clutch rings 23, thus allowing motion to be communicated from the sprocket wheel to the drum.

By inspection of the connections between the sprocket wheels 7 and 12 with the wheels upon the shafting opposite, it will be obvious that the speed of rotation of the drum may be varied by connecting the drum with one or the other of said clutches, the wheel 7 being operated at a faster speed than the wheel 12. In operation the springs 21 tend to hold the drum away from the clutch members and to assist in separating them when the drum is moved in an obvious manner.

In Figs. 2 and 3 the arrangement of the device is identical with that shown in Fig. 1, except that the springs 21 are eliminated and in place thereof a bracket 39' is mounted upon the jack post at each end, and an arm thereon is extended inwardly and has a forked end thereon engaging within a groove 40 in the hubs of the sprocket wheels 7 and 12. This engagement allows the rotation of the sprocket wheels with the fingers at the end of the arm 39' fitting within the groove 40. It serves, however, to prevent longitudinal movement of the sprocket wheels upon the shaft 8. Thus when the drum is moved with the shaft as previously noted, the sprocket wheels 7 with the clutch rings thereon are forced to remain in their longitudinal position allowing the drum to move relative thereto so as to release or set the clutch as desired. The eliminating of the springs 21 also avoids the necessity of using the inner bearing member 22.

The operation of my device has already been described. It will be noted that the operator may easily move the clutch to engage the drum with the desired speed by rotation of the hand wheel 33 in the desired direction. The advantage lies in the fact that the clutch may be engaged gradually so as to prevent shock upon the mechanism. At the same time, it is possible to engage the clutch to the drum positively in such manner as to prevent slipping when desired. One handle will answer to adjust the clutch with accuracy for either high or low speed. It will be furthermore noted that the means for moving the drum and shaft enables the operator to hold the drum in the exact position desired in a manner which will prevent any accidental slipping away from the desired position during operation. The clutch is held rigidly by the hand nut so that no looseness can occur, and the degree of firmness with which the clutch is set is easily adjusted.

Having thus described my invention what I claim as new is:

1. A friction clutch control means including a shaft, a bearing therefor, a cap member threaded to said bearing, and means on said cap and said shaft whereby said shaft may be moved longitudinally with respect to said bearing by movement of said cap.

2. A rotatable shaft, bearings therefor, a hoisting drum having a tapered groove thereon and fixed on said shaft, a wheel on said shaft at the end of said drum, a tapered friction ring member on said wheel shaped to fit within the tapered groove, and means to move said hoisting drum longitudinally relative to said ring to engage the same, said means including a cap threaded to one of said bearings, and a flange on said cap connected with said shaft, whereby longitudinal movement of said cap will move said shaft.

In testimony whereof I hereunto affix my signature this 10th day of May, A. D. 1928.

ARTHUR C. BENSON.